United States Patent
Kurahara et al.

(10) Patent No.: US 9,705,372 B2
(45) Date of Patent: Jul. 11, 2017

(54) ROTATING ELECTRIC MACHINE AND METHOD OF MANUFACTURING SAME

(75) Inventors: Yoshimi Kurahara, Tokyo (JP); Koji Obata, Tokyo (JP); Shuya Hagiwara, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 824 days.

(21) Appl. No.: 14/117,778

(22) PCT Filed: May 21, 2012

(86) PCT No.: PCT/JP2012/062942
§ 371 (c)(1),
(2), (4) Date: Nov. 14, 2013

(87) PCT Pub. No.: WO2012/165195
PCT Pub. Date: Dec. 6, 2012

(65) Prior Publication Data
US 2014/0084713 A1 Mar. 27, 2014

(30) Foreign Application Priority Data
May 27, 2011 (JP) .................................. 2011-118604

(51) Int. Cl.
*H02K 3/30* (2006.01)
*H02K 3/34* (2006.01)
(Continued)

(52) U.S. Cl.
CPC ................. *H02K 3/30* (2013.01); *H02K 3/34* (2013.01); *H02K 3/38* (2013.01); *H02K 15/02* (2013.01);
(Continued)

(58) Field of Classification Search
CPC .. H02K 3/30; H02K 3/34; H02K 3/38; H02K 15/02; H02K 15/12
See application file for complete search history.

(56) References Cited

U.S. PATENT DOCUMENTS 4,160,926 A * 7/1979 Cope ...................... H02K 3/345
174/110 N
6,202,285 B1 * 3/2001 Bell ........................ H02K 15/12
29/596
(Continued)

FOREIGN PATENT DOCUMENTS

JP 61-108052 A 5/1986
JP 62-272836 A 11/1987
(Continued)

OTHER PUBLICATIONS

International Search Report with English translation dated Aug. 14, 2012 (5 pages).

*Primary Examiner* — Dang Le
(74) *Attorney, Agent, or Firm* — Crowell & Moring LLP

(57) ABSTRACT

A rotating electric machine includes: a stator including a stator core, slots provided in the stator core at equal intervals along the circumferential direction, and coils placed in the stator slots and configured to generate a rotating magnetic field; and a rotor rotatably provided with a predetermined rotation gap between the stator core and the rotor, wherein the rotating electric machine further includes a first varnish applied between the slots in the stator core and the coils for impregnation, and a second varnish applied directly onto enamel coating of the coils outside of the slots in the axial direction, the first varnish is a thermosetting varnish having a shear bond strength of a flat wire between the coils and the varnish is higher than that of the second varnish, and the second varnish is a thermosetting varnish having a glass transition temperature of approximately 104° C. or lower and the glass transition temperature of the second varnish by the Dynamic Mechanical Analysis (DMA) method is lower than that of the first varnish.

11 Claims, 15 Drawing Sheets

(51) Int. Cl.
    *H02K 3/38*       (2006.01)
    *H02K 15/12*     (2006.01)
    *H02K 15/02*     (2006.01)

(52) U.S. Cl.
    CPC ........ *H02K 15/12* (2013.01); *Y10T 29/49012* (2015.01)

(56) References Cited

U.S. PATENT DOCUMENTS

| | | |
|---|---|---|
| 6,333,573 B1 | 12/2001 | Nakamura |
| 6,366,000 B1 * | 4/2002 | Higashino ................ H02K 3/12 310/208 |
| 2001/0040418 A1 * | 11/2001 | Higashino ................ H02K 9/06 310/263 |
| 2004/0145250 A1 | 7/2004 | Kudo et al. |
| 2016/0036282 A1 * | 2/2016 | Nakayama ............... H02K 3/38 310/208 |

FOREIGN PATENT DOCUMENTS

| | | |
|---|---|---|
| JP | 5-39178 A | 2/1993 |
| JP | 6-284654 A | 10/1994 |
| JP | 7-75280 A | 3/1995 |
| JP | 10-304612 A | 11/1998 |
| JP | 10-304614 A | 11/1998 |
| JP | 2004-48999 A | 2/2004 |
| JP | 2004-229332 A | 8/2004 |
| JP | 2007-143245 A | 6/2007 |
| JP | 2008-199806 A | 8/2008 |

* cited by examiner

FIG. 12

| CHARACTERISTICS OF VARNISH | COMPARISON BETWEEN VARNISHES |
|---|---|
| SHEAR BOND STRENGTH | FIRST VARNISH > SECOND VARNISH |
| GLASS TRANSITION TEMPERATURE | FIRST VARNISH > SECOND VARNISH |

ROTATING ELECTRIC MACHINE AND METHOD OF MANUFACTURING SAME

TECHNICAL FIELD

The present invention relates to a rotating electric machine and a method of manufacturing the same.

BACKGROUND ART

Recent rotating electric machines suffer from increasing vibration applied to stator coils and heat generation by the stator coils due to higher power.

To suppress vibration of the stator coils in slots in a stator core, it is known to apply varnish (such as epoxy varnish) having a high strength (including a high bond strength and a high heat resistance) between the stator core and the stator coils for impregnation and adhesion. This creates, however, another problem that coating on enameled wires is peeled off due to thermal expansion and thermal shrinkage of the varnish associated with heat cycles and heat shock at coil ends outside of the stator core.

Thus, if a flexible unsaturated polyester varnish having a lower bond strength is used, peel off of the enamel coating can be prevented. However, the adhesion force between the slots in the stator core and the stator coils becomes insufficient and the coils are vibrated.

As described above, it is difficult to provide stator coils of the rotating electric machines with both strength and insulation.

A known example of a method of impregnating coil ends of a rotating electric machine with varnish includes coating the coil ends with chemical protected (CP) resin produced by synthesizing epoxy varnish, and coating the inside and the outside of the stator core with the epoxy varnish, so that external media do not enter the stator coil (for example, see PTL 1). Furthermore, another known method includes impregnating a stator core with epoxy varnish and molding the coil ends with epoxy varnish mixed with a filler (for example, see PTL 2).

CITATION LIST

Patent Literatures

PTL 1: Japanese Utility Model Application Laid-Open No. 5-039178
PTL 2: Japanese Utility Model Application Laid-Open No. 61-108052

SUMMARY OF INVENTION

Technical Problem

With these methods, however, epoxy varnish having a high bond strength is basically used, and it is difficult to achieve the aforementioned object, that is to provide both strength and insulation.

In view of the aforementioned circumstances, the present invention provides a rotating electric machine having both strength and insulation and a method of manufacturing the same.

Solution to Problem

According to a first aspect of the present invention, a rotating electric machine includes: a stator including a stator core, slots provided in the stator core at equal intervals along the circumferential direction, and coils placed in the stator slots and configured to generate a rotating magnetic field; and a rotor rotatably provided with a predetermined rotation gap between the stator core and the rotor, the rotating electric machine further includes a first varnish applied between the slots in the stator core and the coils for impregnation, and a second varnish applied directly on enamel coating of the coils outside of the slots in the axial direction, the first varnish is a thermosetting varnish having a shear bond strength of a flat wire between the coils and the varnish is higher than that of the second varnish, and the second varnish is a thermosetting varnish having a glass transition temperature of approximately 104° C. or lower and the glass transition temperature of the second varnish by the DMA method is lower than that of the first varnish.

According to a second aspect of the present invention, a method of manufacturing a rotating electric machine is a method of manufacturing a rotating electric machine including: a stator including a stator core, slots provided in the stator core at equal intervals along the circumferential direction, and coils placed in the stator slots and configured to generate a rotating magnetic field; and a rotor rotatably provided with a predetermined rotation gap between the stator core and the rotor, wherein the rotating electric machine further comprising a first varnish applied between the slots in the stator core and the coils for impregnation, and a second varnish applied directly on enamel coating of the coils outside of the slots in the axial direction, the first varnish is a thermosetting varnish having a shear bond strength of a flat wire between the coils and the varnish is higher than that of the second varnish, and the second varnish is a thermosetting varnish having a glass transition temperature Tg of approximately 104° C. or lower and the glass transition temperature of the second varnish by the DMA method is lower than that of the first varnish, and the method includes: immersing the stator in which the coils are inserted in a vessel containing the second varnish outside of the stator core up to an insulating paper end and heat curing the second varnish, and then, also immersing the opposite side of the stator up to an insulating paper end and heat curing the second varnish.

Advantageous Effects of Invention

According to the invention, a rotating electric machine having both strength and insulation and a method of manufacturing the same can be provided.

BRIEF DESCRIPTION OF DRAWINGS

FIG. 12 is a table showing the relation between physical properties of the first varnish and the second varnish at the locations.

DESCRIPTION OF EMBODIMENTS

An embodiment of the invention will be described below with reference to the drawings.

Figure 1:
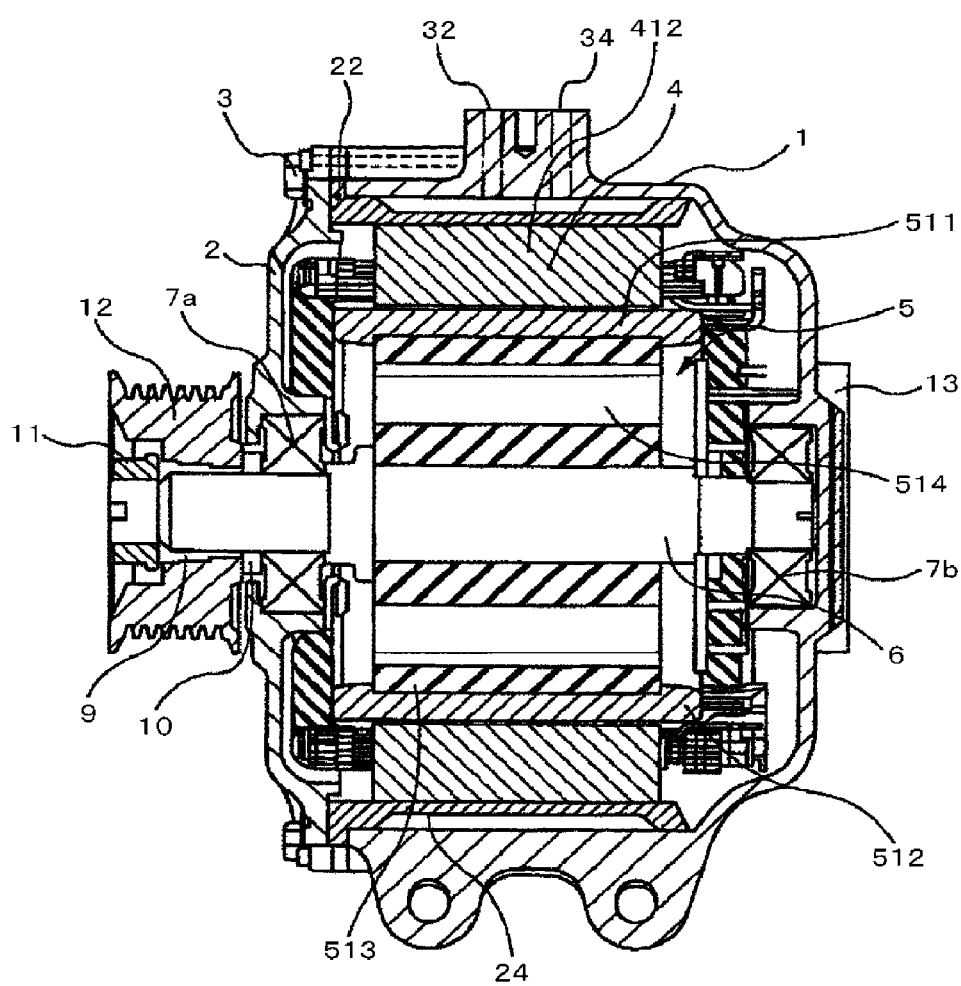
FIG. 1 is a sectional side view of a rotating electric machine according to a first embodiment of the invention.

FIG. 1 is a sectional side view of an induction motor according to a first embodiment. A squirrel cage induction motor that is an example of a rotating electric machine includes a housing having a cylindrical shape with one end in the axial direction being open and a bottom being closed, and a cover 2 for searing the open end of the housing 1. The housing 1 and the cover 2 are fastened together with multiple, such as six, bolts 3. The housing 1 is provided therein with a water channel member 22 to which a stator 4 is fixed inside thereof by shrink fit or in other manners. A flange at the left end of the water channel member 22 in FIG. 1 is fixed between the housing 1 and the cover 2, and a water channel 24 is formed between the water channel member 22 and the housing 1. Coolant for cooling the rotating electric machine is introduced into the water channel through an inlet 32 formed in the housing 1, and then discharged through an outlet 34 in the housing 1.

Figure 2:
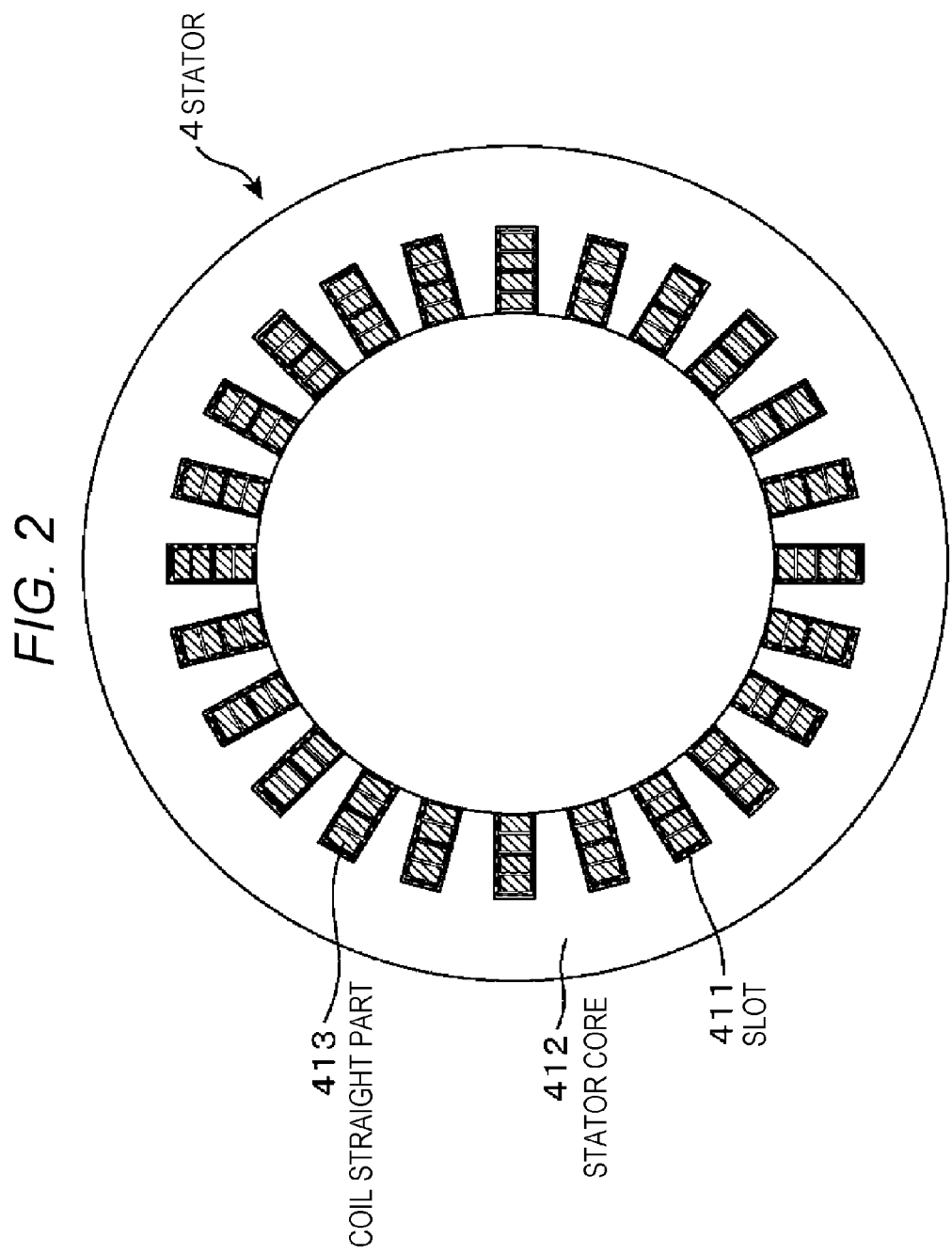
FIG. 2 is a cross-sectional view of a stator of the rotating electric machine illustrated in FIG. 1.

FIG. 2 is a cross-sectional view of the stator in FIG. 1. The stator 4 includes a stator core 412 having multiple slots 411 at equal intervals along the circumference, and three-phase stator coils 413 inserted in the respective slots 411. The stator core 412 in which the stator coils 413 are inserted has 24 slots 411 formed therein. The stator core 412 is made of laminated steel formed by forming electromagnetic steel sheets having a thickness of 0.05 to 0.35 mm by punching or etching and laminating the formed electromagnetic steel sheets, for example, and has multiple slots 411 arranged radially at equal intervals along the circumference.

On the inner side of the stator core 412, a rotor 5 is rotatably arranged facing the stator core 412 with a minute gap therebetween. The rotor 5 is fixed to a shaft 6 and rotates integrally with the shaft 6. The shaft 6 is rotatably supported by a pair of ball bearings 7a, 7b provided in the housing 1 and the cover 2, respectively. The bearing 7a of these bearings 7a, 7b that is in the cover 2 is fixed to the cover 2 by a fixing plate, which is not illustrated, and the bearing 7b at the bottom of the housing 1 is fixed to a recess formed in the bottom of the housing 1.

A pulley 12 is attached to the left end of the shaft 6 with a nut 11. A sleeve 9 and a spacer 10 are provided between the pulley 12 of the shaft 6 and the bearing 7a. The outer circumference of the sleeve 9 and the inner circumference of the pulley 12 have a subconical shape, the pulley 12 and the shaft 6 are securely integrated by the clamping force of the nut 11 so as to be integrally rotatable. When the rotor 5 is driven to rotate relative to the stator 4, the rotating force of the shaft 6 is output to the outside by the pulley 12. For functioning as a generator, the rotating force from the pulley 12 is input to the shaft 6.

Figure 3:
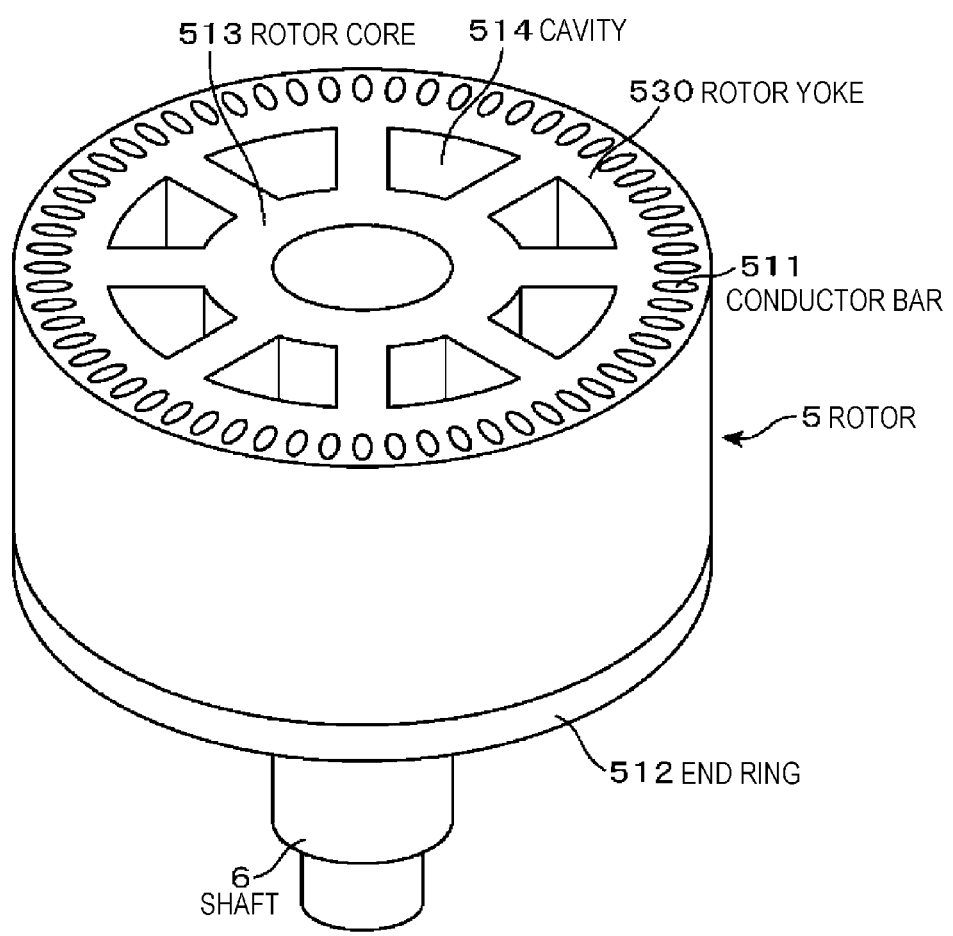
FIG. 3 is a cross-sectional perspective view of a rotor of the rotating electric machine illustrated in FIG. 1.

FIG. 3 is a perspective view of the rotor 5 in FIG. 1.

As illustrated in FIG. 3, a rotor core 513 of the rotor 5 that is a squirrel cage rotor has embedded therein multiple conductor bars 511 extending in the rotation axis direction at equal intervals along the whole circumference. The rotor core 513 is made of a magnetic material, and is provided at each of the ends in the axial direction with an end ring 512 for short-circuiting the conductor bars 511. In the perspective view of FIG. 3, a sectional structure taken along a plane perpendicular to the rotation axis is illustrated and the end ring 512 on the side of the pulley 12 and the shaft 6 are not illustrated to clearly show the relation between the rotor core 513 and the conductor bars 511.

The rotor core 513 is made of laminated steel formed by forming electromagnetic steel sheets having a thickness of 0.05 to 0.35 mm by punching or etching and laminating the formed electromagnetic steels sheets, for example. As illustrated in FIG. 3, the rotor core 513 has cavities 514 having a substantially fan shape on the inner side thereof at equal intervals along the circumference for reducing weight. The rotor core 513 has the conductor bars 511 mentioned above embedded on the outer side thereof, that is, on the side of the stator, and a magnetic circuit formed on a rotor yoke 530 on the inner side of the conductor bars 511. The conductor bars 511 and the end rings 512 are made of aluminum and integrated with the rotor core 513 by die casting. The end rings 512 located at both ends of the rotor core are provided to project from both ends in the axial direction of the rotor core 513. Although not illustrated in FIG. 1, the housing 1 is provided at the bottom with a detection rotor for detecting the rotation of the rotor 5. A rotation sensor 13 detects teeth of the rotating detection rotor and outputs an electric signal for detecting the position of the rotor 5 and the rotational speed of the rotor 5.

Figure 4:
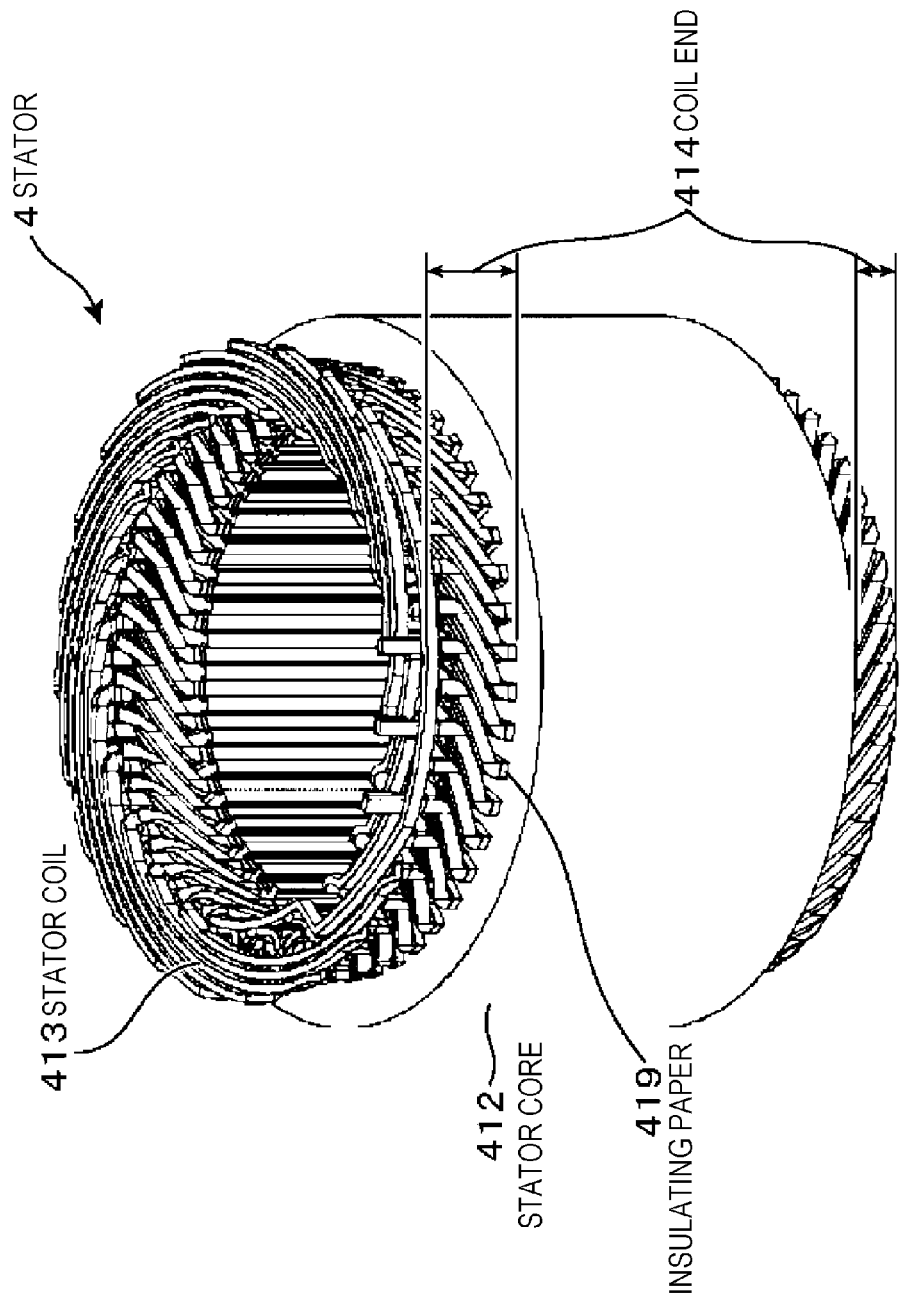
FIG. 4 is a perspective view of the stator having a lap winding structure.

FIG. 4 illustrates the stator core 412, and the stator coils 413 placed in the slots 411 and extending from inside of the stator core to outside thereof in the longitudinal direction (axial direction. A stator coil 413 is inserted in a pair of slots between which a predetermined number of slots are arranged. The stator core 412 has coil ends 414 formed at both end faces by the stator coils projecting outward from the slots. The coil ends 414 have straight parts near exits of the respective slots where the stator coils 413 extend linearly and insulating paper 419 is wound between the stator core 412 and the stator coils 413. The stator core 412, the stator coils 413 placed in the stator core 412 and the insulating paper 419 are vibrated by the rotational vibration of the rotor 5 provided rotatably with a gap. To prevent the vibration of the stator core 412 and the stator coil 413 and for electric insulation protection against damage caused during insertion of the stator coils 413 into the stator core 412, the inside of the stator core is impregnated with adhesive varnish. Furthermore, for insulation protection between strands of the stator coils 413 at the coil ends 414, the adhesive varnish is applied to the coil surfaces. The adhesive varnish applied to the coil ends 414 has a high bond strength, and is thus disadvantageous in that enamel coating on the coils is peeled off due to thermal shrinkage force of the varnish when the temperature lowers from a high-temperature environment.

Thus, in the first embodiment, the stator 4 in which a first varnish 415 is applied to the stator core 412 and the slots for the stator coils 413 and a second varnish 416 is applied to the coil ends 414 outside of the stator core is provided.

Figure 5:
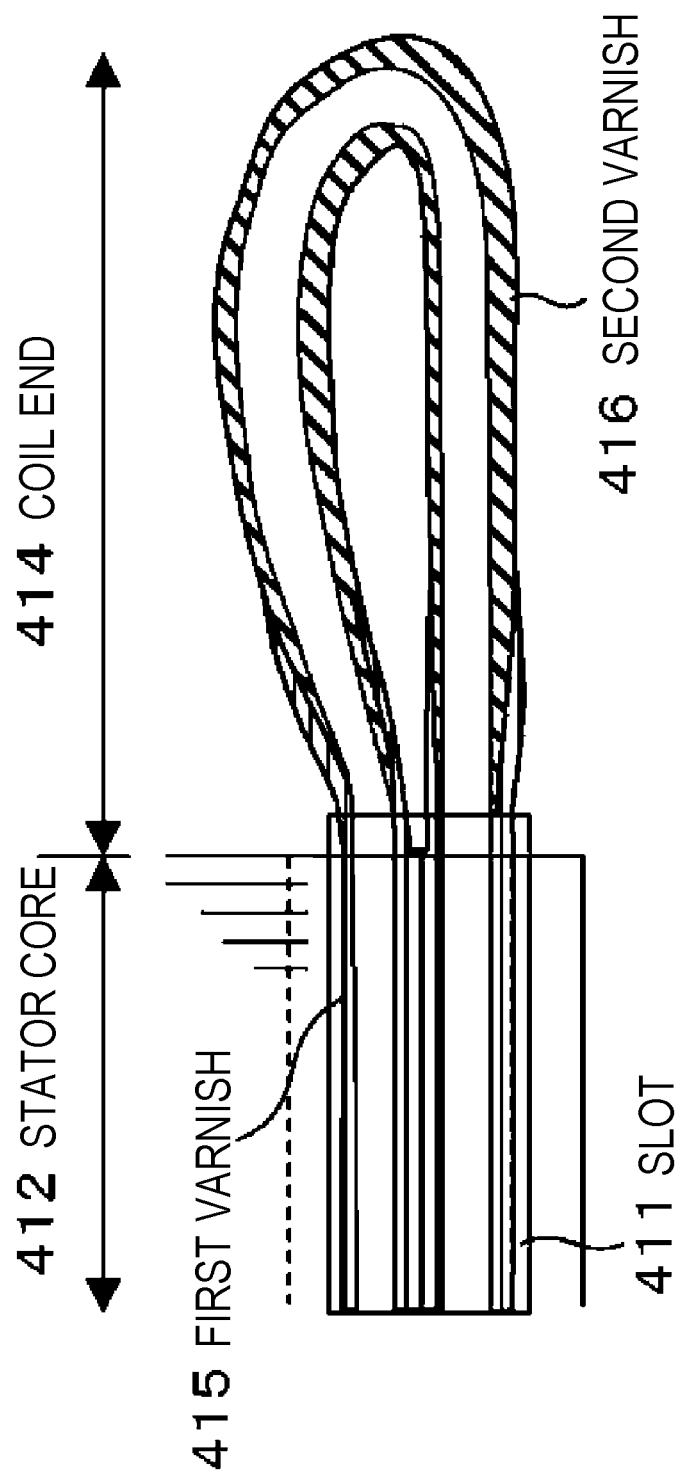
FIG. 5 is a cross-sectional view of coils inserted in a stator core.
Figure 6:
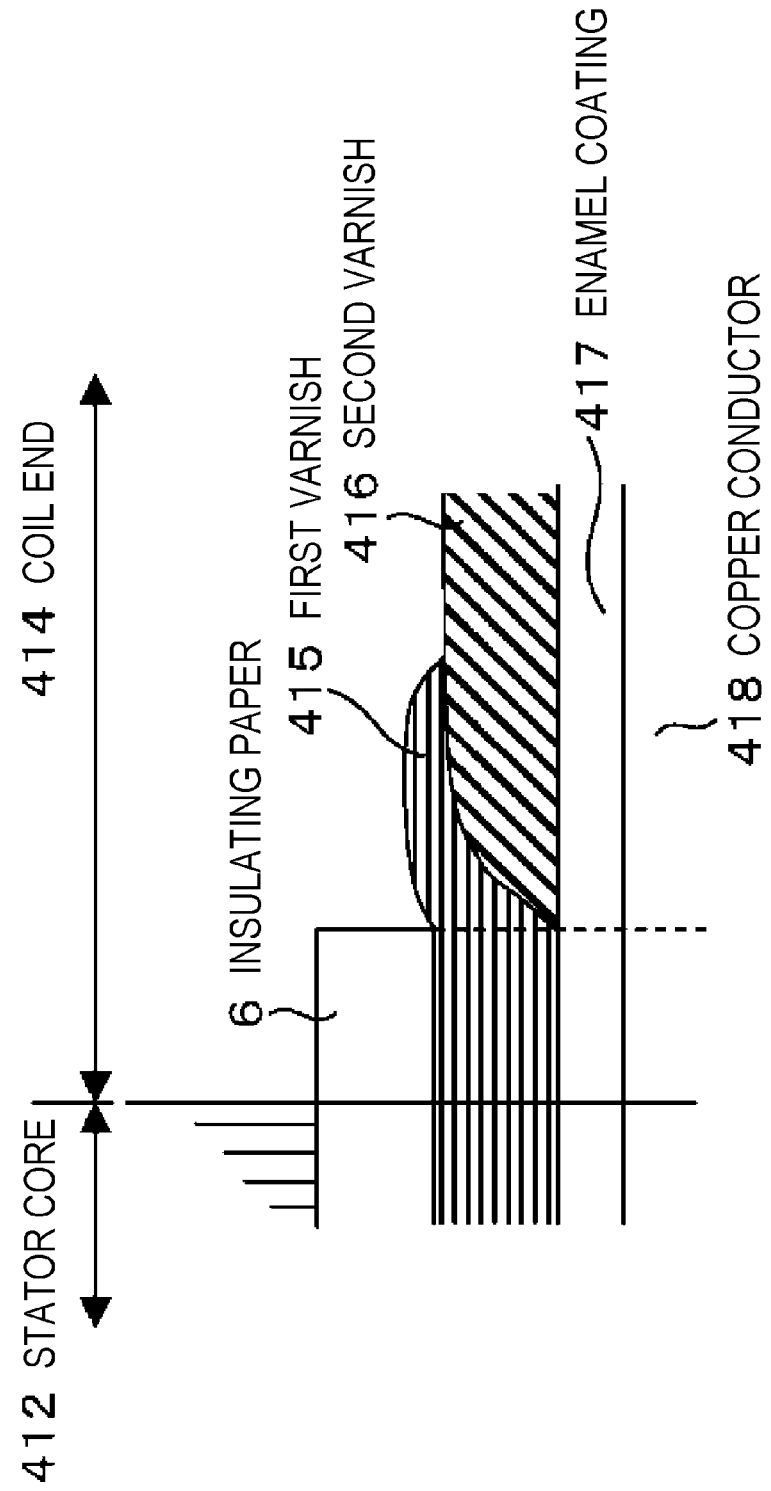
FIG. 6 is an enlarged sectional view of a contact part between two varnishes outside of the stator core.

The features of the stator 4 in the first embodiment will be described in detail below. FIG. 5 illustrates a cross-sectional view of the coil ends 414 near the exits of the slots, and FIG. 6 illustrates an enlarged cross sectional view of a contact part between the first varnish 415 and the second varnish 416 of FIG. 5. The first varnish is formed through impregnation to overlap with the second varnish applied to the inside of the slots of the stator core 412 and the coil ends 414 outside of the stator core 412 outward in the axial direction from the insulating paper end. In this process, the varnish applied to the coil ends 414 outside of the stator core 412 includes one varnish from inside of the stator core to the insulating paper end, two varnishes from the insulating paper end to the overlap end of the first varnish, and one varnish from the overlap end of the first varnish and the second varnish to the extreme end of the coil end. In other words, the contact part between the first varnish and second varnish has two layers in the radial direction.

Figure 7:
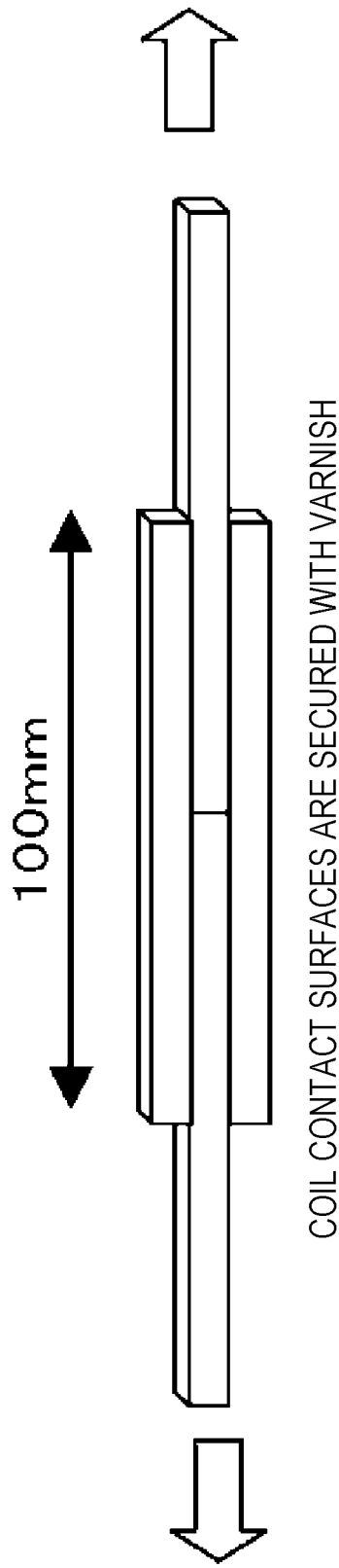
FIG. 7 is an explanatory view for explaining a shear bond strength test of a flat wire.
Figure 8:
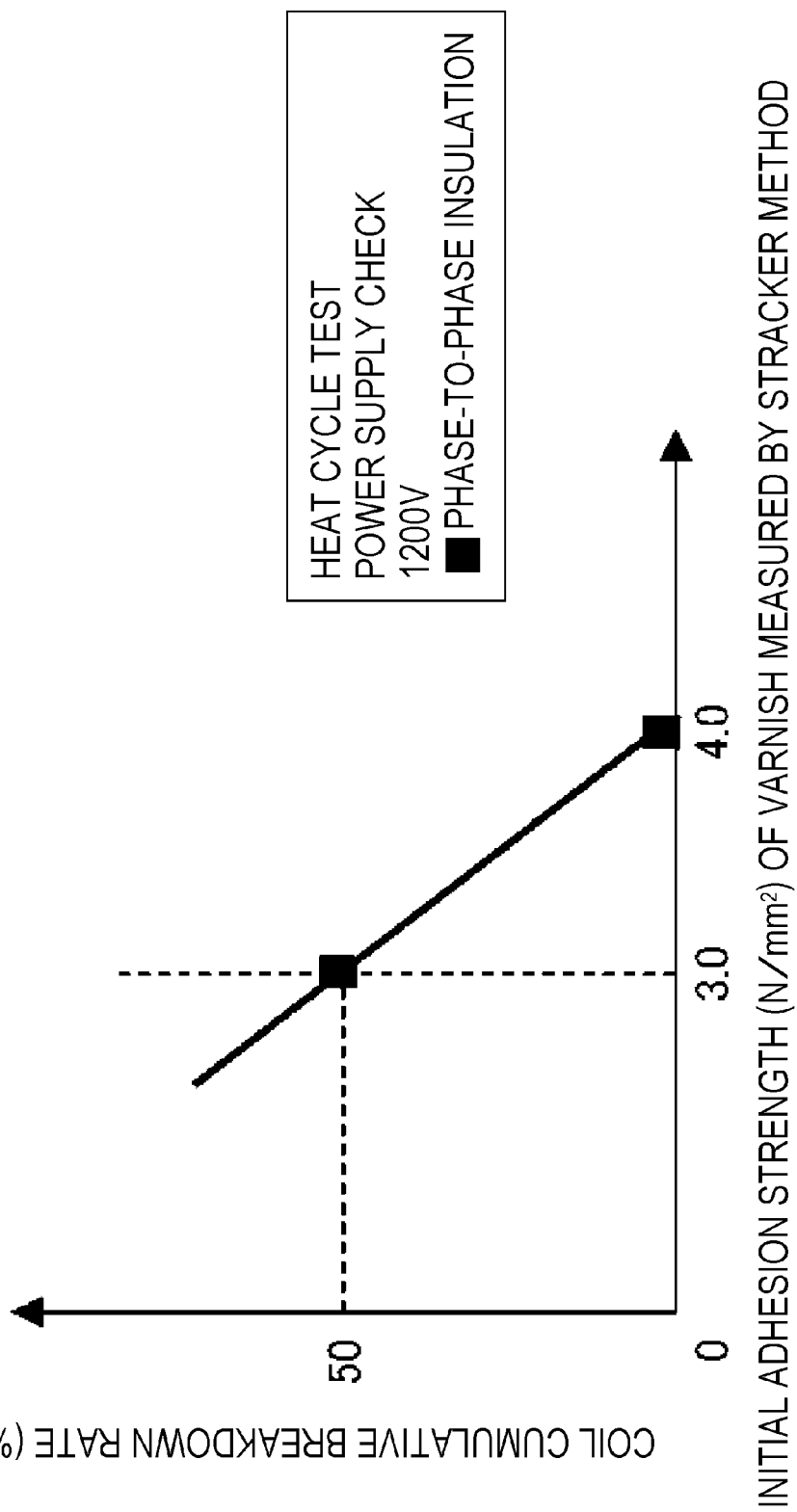
FIG. 8 is an explanatory graph explaining the relation between the shear bond strength of varnish and the breakdown rate.

FIG. 7 is an explanatory view for explaining a shear bond strength test of a flat wire, and FIG. 8 is an explanatory view of the relation between the shear bond strength of varnish and the breakdown rate. The first varnish 415 is desirably a material having a high bond strength between the slots of the stator core 412 and the stator coils 413. Physical properties of materials suitable for the first varnish 415 will be described. The shear bond strength of the first varnish 415 is measured by measuring the tensile breaking strength of a sample formed by impregnating a combination of four flat wires with the first varnish 415 and drying the impregnated wires as illustrated in FIG. 7. The breakdown rate in FIG. 8 represents the percentage of coils subjected to breakdown after inserting the flat wires into a model of the stator core of 100 mm×100 mm×13 mm, conducting a heat cycle test on the model, and applying a voltage of 1200 V for ten minutes. When a varnish having an initial adhesion strength of 4.0 N/mm$^2$ or higher measured by the Stracker method is used as the first varnish 415, the coil cumulative breakdown rate is 0%. When a varnish of 3.0 N/mm$^2$, for example, that is a varnish having an initial adhesion strength lower than 4.0 N/mm$^2$ is used, however, the cumulative breakdown rate is 50% or lower, and thus this varnish is not suitable for the first varnish. Examples of such a varnish having an initial adhesive strength of 40 N/mm$^2$ or higher as mentioned above include epoxy varnish.

Figure 9:
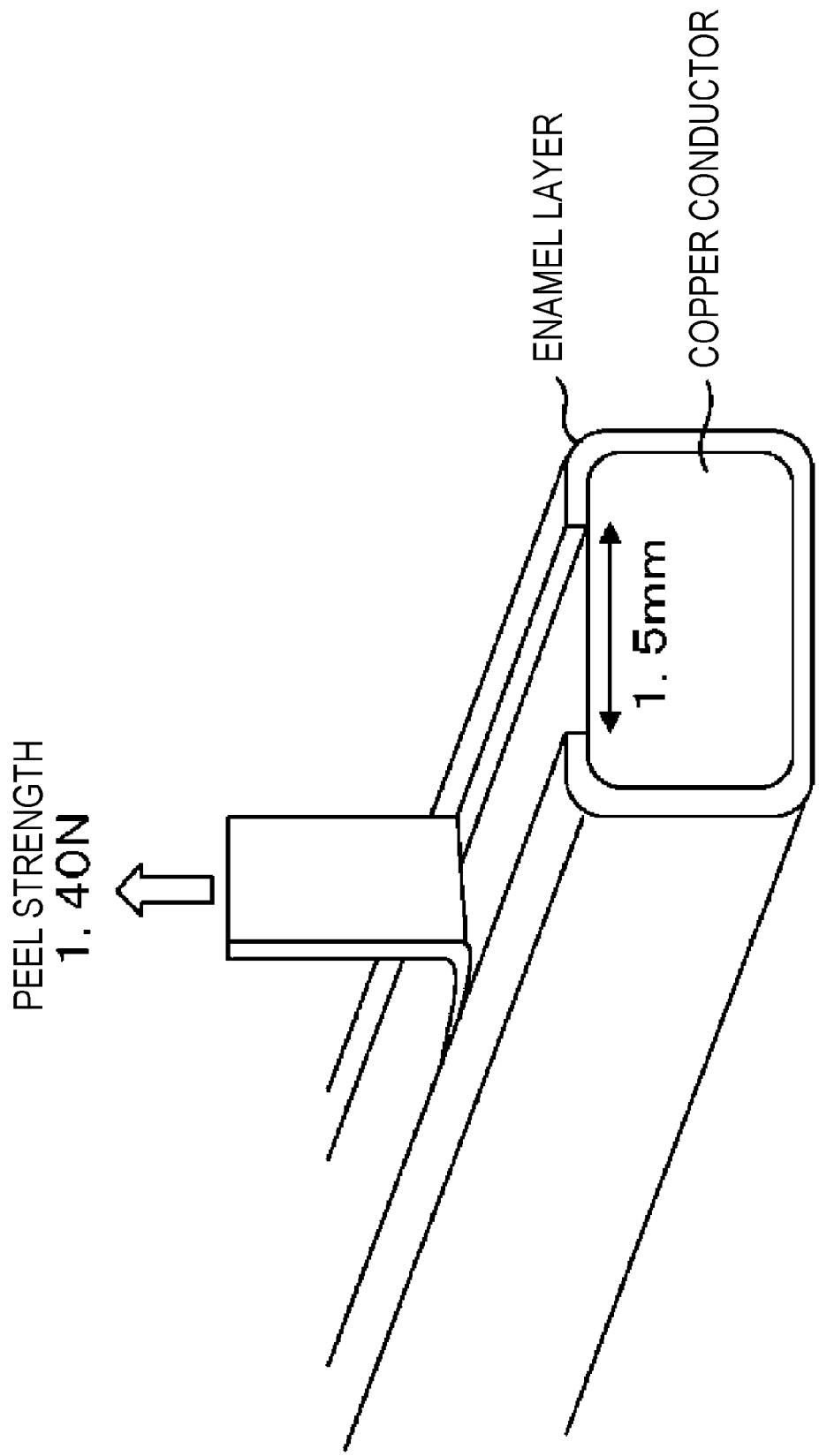
FIG. 9 is an explanatory view illustrating actual measurement of peeling off of an enamel coating.
Figure 10:
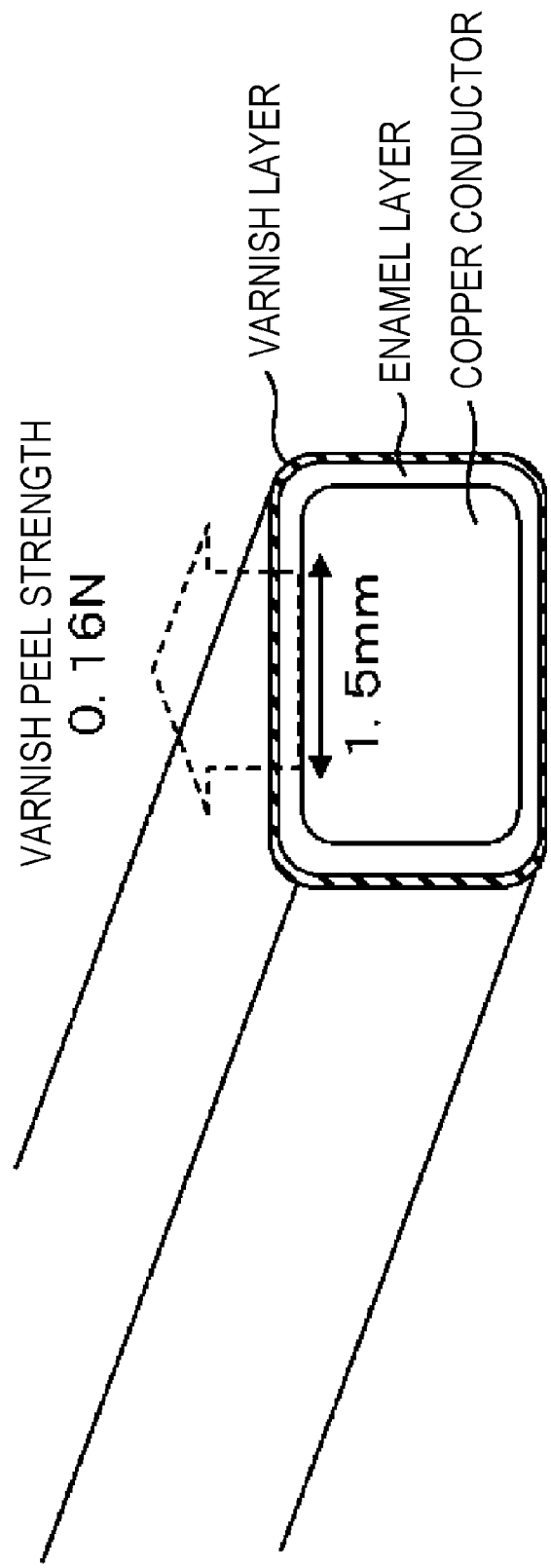
FIG. 10 is an explanatory view illustrating a model of peeling off of the enamel coating for calculation.
Figure 11:
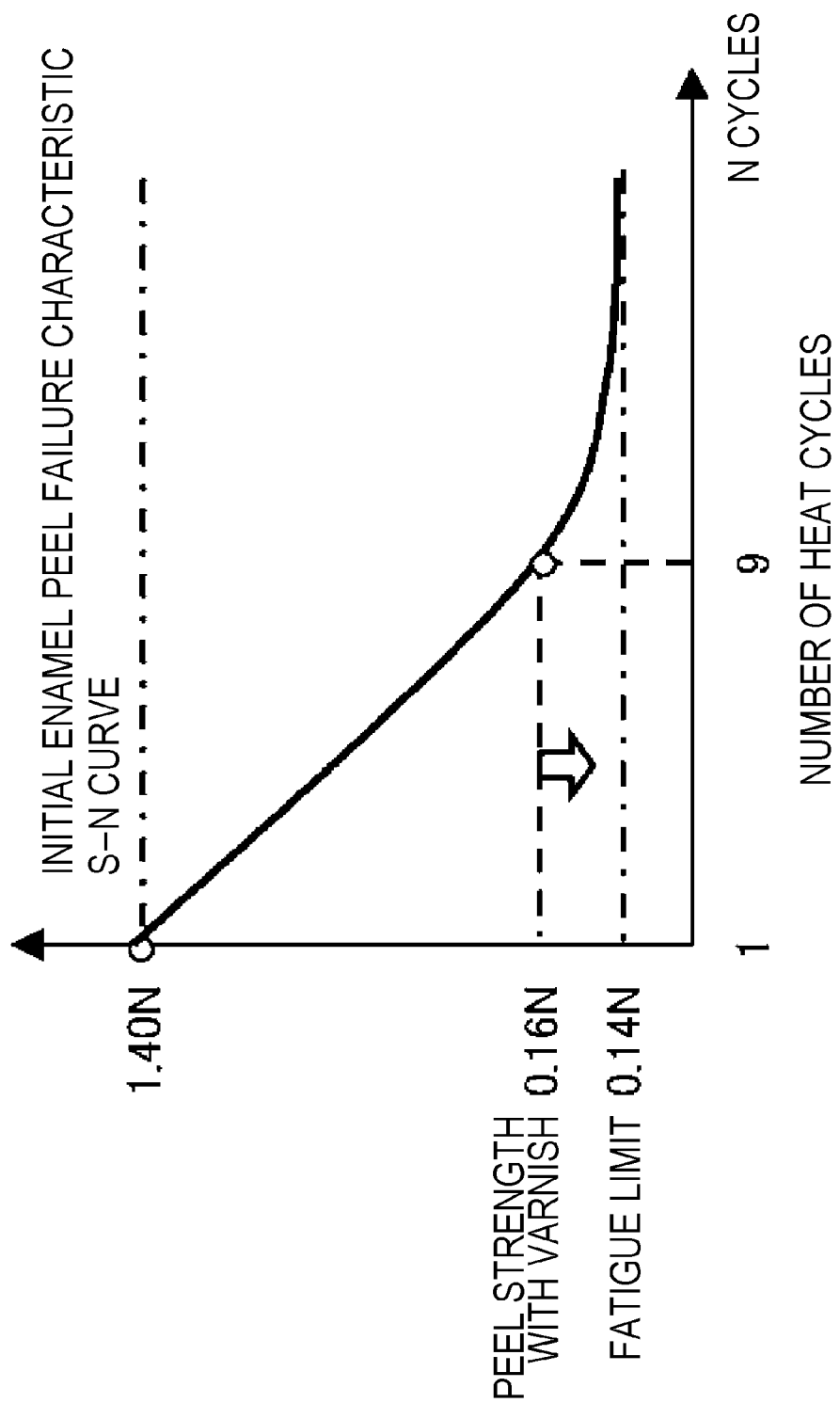
FIG. 11 is an explanatory graph for explaining the relation between the varnish peel strength and the peel-off load on enamel.

FIG. 9 is a view of measurement of peeling off of an enamel coating, and FIG. 10 shows a result of calculating the varnish peel strength. FIG. 11 is a graph for explaining the relation between the varnish peel strength and the peel-off load on enamel. The second varnish 416 applied to the coil ends 414 outside of the stator core 412 in FIG. 5 is desirably a material having a low thermal shrinkage force that does not cause the enamel coating on the coil ends 414 to peel off. Physical properties of the materials suitable for the second varnish 416 will be described. The peel strength of the stator coils alone is measured by using an AIW flat wire (3.23 mm×2.47 mm), making a slit having a width of 1.55 mm in the radial direction of the enamel coating, and measuring the peel strength of the enamel coating in the axial direction as shown in FIG. 9. The peel-off load obtained by thermal analysis of the varnish shown in FIG. 10 is calculated by using a size of 1.5 mm in width in the radial direction and the physical properties (a linear expansion coefficient of 5.1×10$^{-5}$/° C., a modulus of elasticity modulus of elasticity of 3000 Mpa, a glass transition temperature Tg of 125° C.) of epoxy varnish. The actually measured peel strength of the enamel coating is 1.4 N in average as shown in FIG. 11, and since the cyclic fatigue limit strength of an organic material such as the enamel coating lowers to about 1/10, the fatigue limit strength of the epoxy varnish can be assumed to be about 0.14 N. In the meantime, the peel-off load obtained by thermal analysis of the varnish is 0.16 N, and peeling off occurs when this reaches the fatigue limit strength of 0.14 N. The fatigue limit thermal stress σ' of the epoxy varnish obtained from the ratio 0.88 (0.14N/0.16N) of the fatigue limit strength to the peel-off load resulting from the thermal analysis of the epoxy varnish and the simple thermal stress σ' (a linear expansion coefficient α of 5.1×10$^{-5}$/° C.×a modulus of elasticity E of 3,000 Mpa×a glass transition temperature Tg of 125° C.) of the epoxy varnish is about 13 MPa. When there is no difference in physical properties of the linear expansion coefficient α' and the modulus of elasticity E' between the epoxy varnish and unsaturated polyester varnish, for example, the maximum glass transition temperature Tg' for the fatigue limit thermal stress σ' required of the second varnish 416 is about 104° C. Thus, the second varnish 416 is preferably a varnish having a glass transition temperature of about 104° C. or lower. A typical example of the suitable material having a glass transition temperature Tg of 104° C. or lower is unsaturated polyester varnish having a glass transition temperature of 40 to 105° C.

FIG. 12 shows the characteristics required of the first varnish 415 and the second varnish 416 obtained through the study described above and the basis for the determination thereof. The first varnish 415 can be formed by using a thermosetting varnish with a shear bond strength between the coils of the flat wire and the varnish than the second varnish applied to outside of the stator core 412 and with a glass transition temperature Tg by the DMA method higher than that of the second varnish. For example, it is preferable to use two different polymer materials such as epoxy varnish that is a polymer material for the first varnish 415 and unsaturated polyester varnish for the second varnish 416. If the same polymer material is used for the first varnish 415 and the second varnish 416, a combination of the first varnish 415 and the second varnish 416 using the same epoxy varnish that is a polymer material but rubber that is a polymer material having flexible chains being added only to the second varnish 416 to lower the glass transition temperature Tg.

Figure 13:
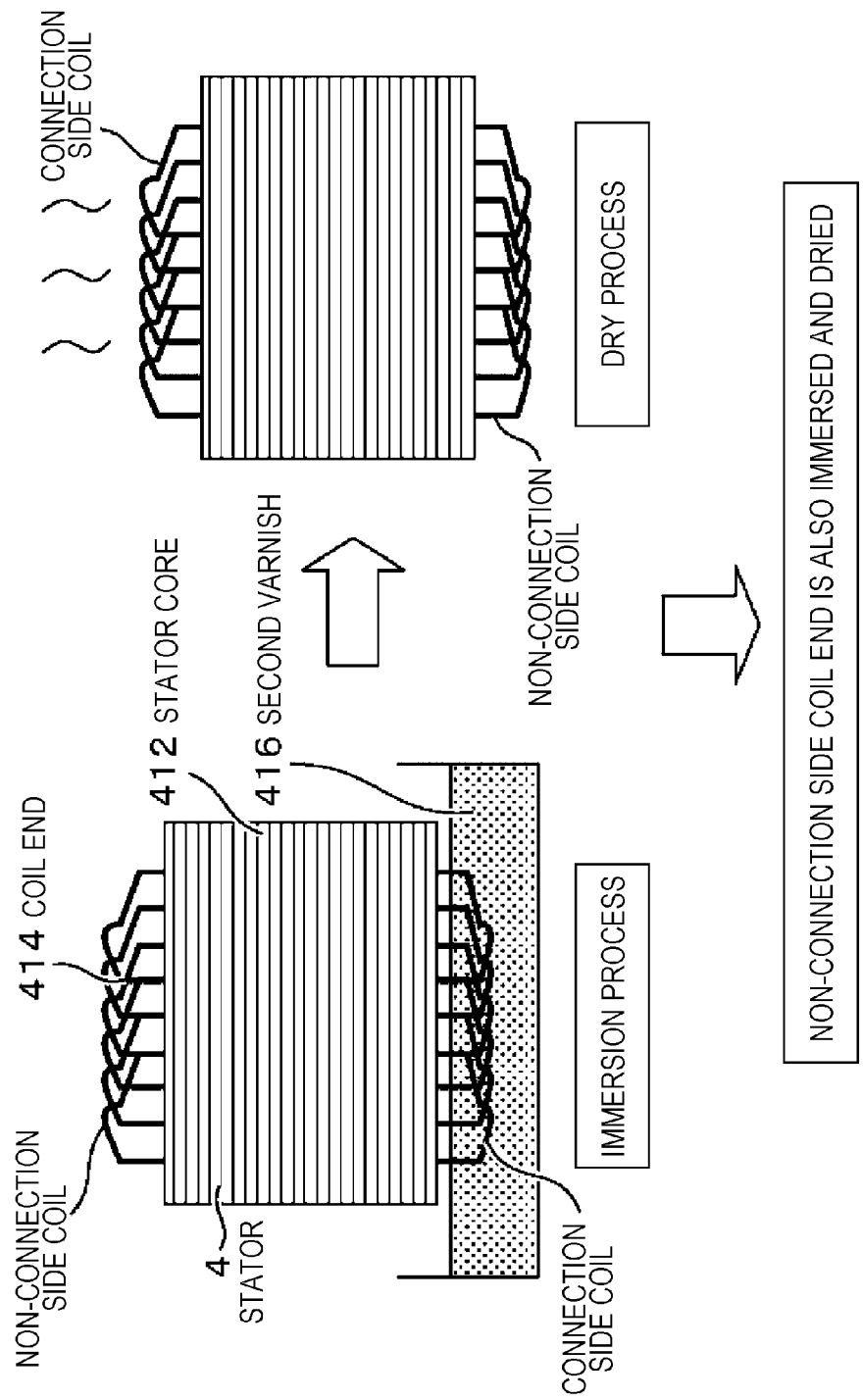
FIG. 13 is an explanatory view illustrating a process of immersing coil ends with the second varnish and a process of drying.
Figure 14:
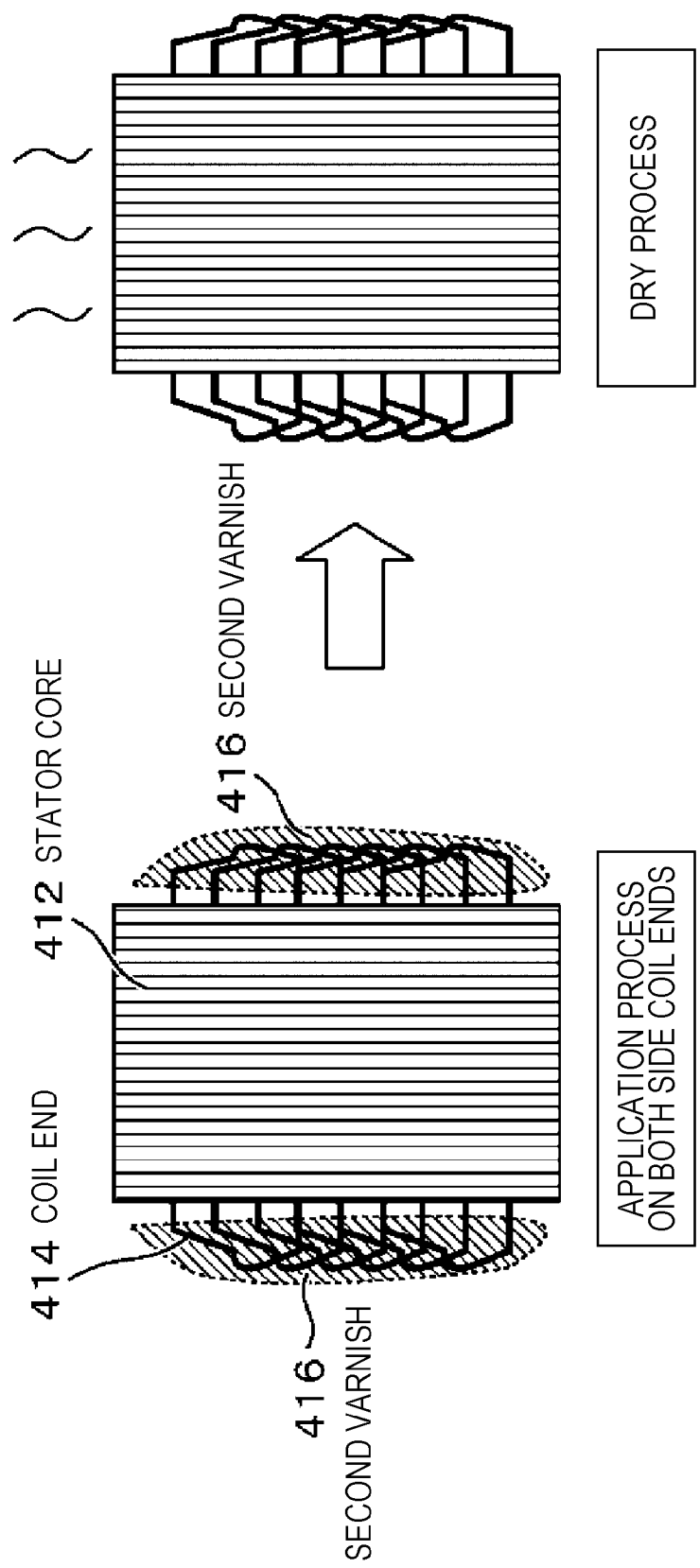
FIG. 14 is an explanatory view illustrating a process of applying the second varnish to the coil ends.

Next, a method of manufacturing a rotating electric machine according to the first embodiment will be described. FIG. 13 is an explanatory view explaining a method of immersion coating of the second varnish. As illustrated in FIG. 13, the second varnish 416 can be formed by immersing connection side coils of the stator 4 in which the coils are inserted in a vessel containing the second varnish 416 up to the insulating paper end and heat curing the second varnish 416, and then, also immersing non-connection side coils of the stator 4 up to the insulating paper end and heat curing the second varnish 416. FIG. 14 is an explanatory view explaining a method of applying the second varnish 416 onto surfaces. As illustrated in FIG. 14, the second varnish 416 can alternatively be formed by applying the second varnish 416 onto the coil surfaces of the coil ends 414 on both sides from the insulating paper ends of the coil ends 414 outward in the axial direction with a brush and heat curing the second varnish 416. In this process, it should be noted that the second varnish does not enter the stator 4 and block the immersion path of the first varnish.

Figure 15:
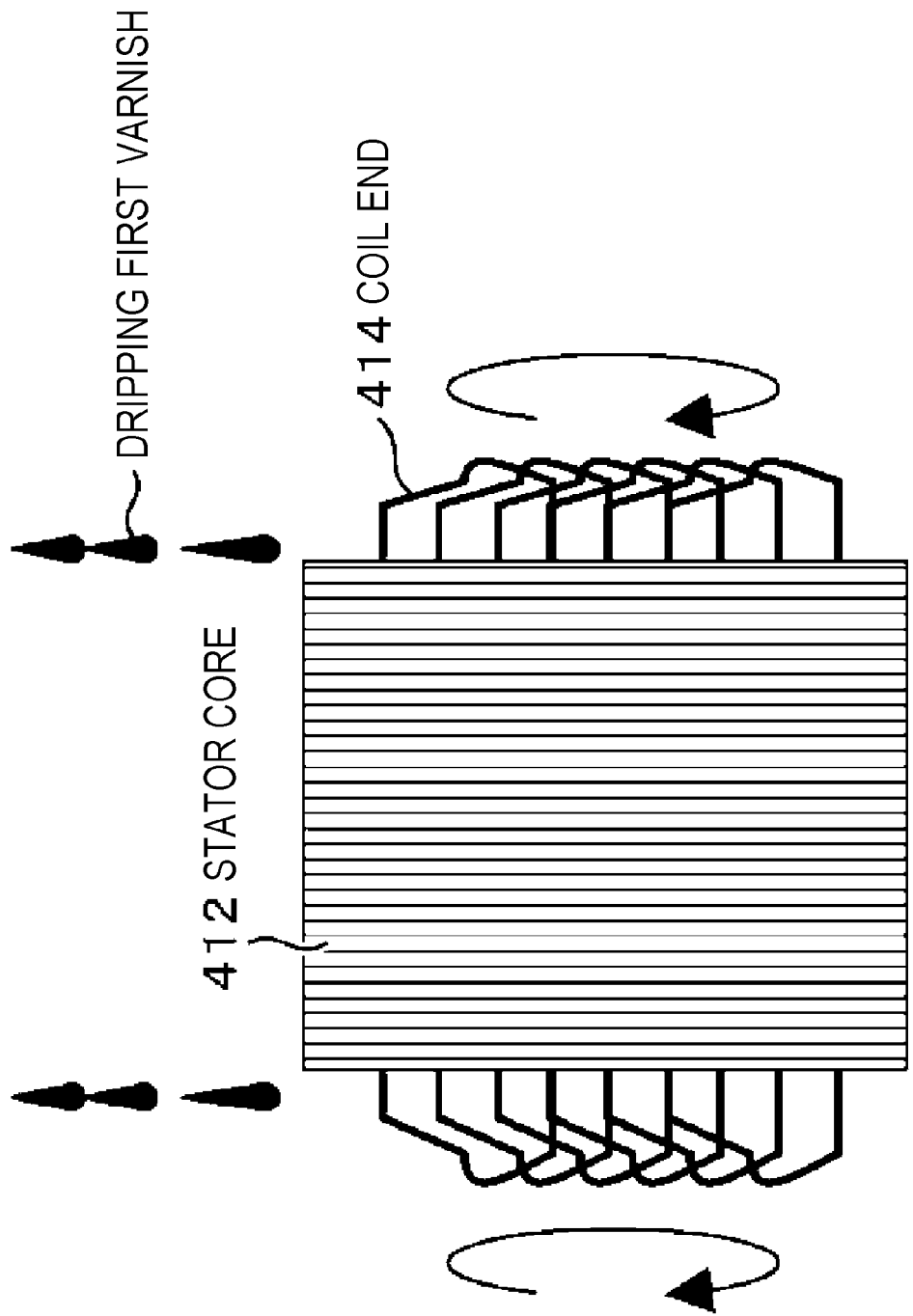
FIG. 15 is an explanatory view illustrating a method of dripping the first varnish into slots of the stator core for impregnation thereof.

FIG. 15 is an explanatory view explaining a method of impregnation with the first varnish. After the second varnish 416 is formed, the stator 4 is preheated, and then rotated with the axis being in the horizontal direction as illustrated in FIG. 15 so that the first varnish 415 is dripped into the openings of the slots 411 in the stator core 412 for impregnation thereof and heat cured. The first varnish can enter the gaps between the insulating paper, the coils and the stator by capillarity and the gaps can thus be impregnated. The stator 4 having the first varnish 415 and the second varnish can be formed by such a manufacturing method. In this process, the varnish applied to the stator core 412 and the coil ends 414 outside of the stator core include one varnish from the inside of the stator core up to the insulating paper end outward in the axial direction, two varnishes from the insulating paper end for a certain distance, and one varnish from the end of the two varnishes up to a turn part at the extreme end of the coil end.

In the embodiment described above, the following effects can be produced. A rotating electric machine includes a stator 4 having multiple slots 411 formed in a stator core 412 in which stator coils 413 are inserted, and a rotor 5 rotatably provided inside of the stator 4. Between the slots 411 of the stator core 412 and the stator coils 4, a first varnish 415 having a shear bond strength of a flat wire between the slots 411 of the stator core 412 and the stator coils 413 equivalent to that of epoxy varnish is formed. This first varnish 415 can prevent cracks caused by coil vibration during operation of the rotating electric machine. On the other hand, second varnish 416 is formed on the stator coils 413 outside of the stator core. The second varnish has a glass transition temperature Tg lower than that of the first varnish 415, the glass transition temperature Tg being 104° C. or lower, which can reduce thermal shrinkage of the varnish and prevent peeling off of the enamel coating when the temperature is lowered. As a result of forming the first varnish 415 and the second varnish 416, a rotating electric machine having resistance to vibration and resistance to heat cycles can be produced.

As described above, according to the embodiment, as a result of impregnating the slots in the stator core with a varnish having a high bond strength, cracks caused by vibration of the rotating electric machine can be prevented, and as a result of applying a flexible varnish with a low heat shrinkage to the coil ends outside of the stator core, coating of enameled wire at the coil ends can be prevented from peeled off. The synergy of the two of varnishes can extend the insulation life and increase the reliability of the rotating electric machine. Consequently, a rotating electric machine excellent in heat cycle resistance and heat shock resistance can be provided.

Note that the embodiment described above is suitable for applications requiring strict conditions on vibration applied to the stator coils of the rotating electric machine and on heat generated by the stator coils due to higher power such as hybrid automobiles and electric automobiles.

Furthermore, although a squirrel cage induction motor is presented above as an example of the rotating electric machine, the rotating electric machine may be applied to any rotating electric machine such as a synchronous rotating electric machine (magnet motor), a Lundell alternator, or a reluctance motor.

While examples of the embodiment are described above, the invention is not limited to these examples. Other aspects conceivable within the technical ideas are also included in the scope of the invention.

The disclosure of the following application the priority of which is claimed is incorporated herein by reference:

Japanese Patent Application Number 2011-118604 (filed on May 27, 2011).

The invention claimed is:

1. A rotating electric machine comprising:
    a stator including a stator core, slots provided in the stator core at equal intervals along the circumferential direction, and coils placed in the stator slots and configured to generate a rotating magnetic field; and
    a rotor rotatably provided with a predetermined rotation gap between the stator core and the rotor, wherein
    the rotating electric machine further comprising a first varnish applied between the slots in the stator core and the coils for impregnation, and a second varnish applied directly on enamel coating of the coils outside of the slots in the axial direction,
    the first varnish is a thermosetting varnish having a shear bond strength of a flat wire between the coils and the varnish is higher than that of the second varnish, and
    the second varnish is a thermosetting varnish having a glass transition temperature of approximately 104° C. or lower and the glass transition temperature of the second varnish by a Dynamic Mechanical Analysis (DMA) method is lower than that of the first varnish.

2. The rotating electric machine according to claim 1, wherein a contact part of the first varnish and the second varnish has two layers in the radial direction.

3. The rotating electric machine according to claim 1, wherein the varnish applied to coil ends outside of the stator core includes one varnish from inside of the stator core to an insulating paper end, two varnishes from an insulating paper end to an end of a layered part of the first varnish and the second varnish, and one varnish from the end of the layered part of the first varnish and the second varnish to extreme ends of the coil ends.

4. The rotating electric machine according to claim 1, wherein the second varnish is a varnish applied to the coils outside of the slots in the axial direction before the first varnish.

5. The rotating electric machine according to claim 1, wherein the first varnish is a varnish having polymer components different from those of the second varnish.

6. The rotating electric machine according to claim 1, wherein the first varnish is varnished with epoxy varnish.

7. The rotating electric machine according to claim 1, wherein the second varnish is unsaturated polyester varnish.

8. The rotating electric machine according to claim 1, wherein the second varnish is a varnish of the same polymer components as the first varnish, and a polymer having flexible chains is added to the second varnish to lower the glass transition temperature of the second varnish.

9. A method of manufacturing a rotating electric machine including: a stator including a stator core, slots provided in the stator core at equal intervals along the circumferential direction, and coils placed in the stator slots and configured to generate a rotating magnetic field; and a rotor rotatably provided with a predetermined rotation gap between the stator core and the rotor, wherein the rotating electric machine further comprising a first varnish applied between the slots in the stator core and the coils for impregnation, and a second varnish applied directly on enamel coating of the coils outside of the slots in the axial direction, the first varnish is a thermosetting varnish having a shear bond strength of a flat wire between the coils and the varnish is higher than that of the second varnish, and the second varnish is a thermosetting varnish having a glass transition temperature Tg of approximately 104° C. or lower and the glass transition temperature of the second varnish by a Dynamic Mechanical Analysis (DMA) method is lower than that of the first varnish, the method comprising:

immersing the stator in which the coils are inserted in a vessel containing the second varnish outside of the stator core up to an insulating paper end and heat curing the second varnish, and then, also immersing the opposite side of the stator up to an insulating paper end and heat curing the second varnish.

10. The method of manufacturing a rotating electric machine according to claim 9, wherein the second varnish is applied onto the surfaces of the coils outside of the stator core with a brush from an insulating paper end outside of the stator core outward in the axial direction outward and heat cured.

11. The method of manufacturing a rotating electric machine according to claim 9, wherein the first varnish is dripped into openings of the slots in the stator core for impregnation and heat cured while the stator to which the second varnish is applied is rotated with the axis being in the horizontal direction.

\* \* \* \* \*